United States Patent
Kogelman

(10) Patent No.: US 11,550,550 B2
(45) Date of Patent: *Jan. 10, 2023

(54) COMBINED BUILDING OF DUAL REPRESENTATION PROGRAM INSTRUCTIONS

(71) Applicant: Electronic Arts Inc., Redwood City, CA (US)

(72) Inventor: Jean-Paul Alexander Kogelman, Vancouver (CA)

(73) Assignee: Electronic Arts Inc., Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/383,036

(22) Filed: Jul. 22, 2021

(65) Prior Publication Data

US 2022/0035603 A1 Feb. 3, 2022

Related U.S. Application Data

(63) Continuation of application No. 16/941,020, filed on Jul. 28, 2020, now Pat. No. 11,080,026.

(51) Int. Cl.
*G06F 9/44* (2018.01)
*G06F 8/34* (2018.01)
*G06F 8/41* (2018.01)

(52) U.S. Cl.
CPC .......... *G06F 8/34* (2013.01); *G06F 8/41* (2013.01)

(58) Field of Classification Search
CPC ................................. G06F 8/34; G06F 8/41

USPC .......................................................... 717/109
See application file for complete search history.

(56) References Cited

U.S. PATENT DOCUMENTS

| | | | |
|---|---|---|---|
| 2003/0071845 A1 | 4/2003 | King et al. | |
| 2003/0107599 A1 | 6/2003 | Fuller et al. | |
| 2006/0009944 A1 | 1/2006 | Shah et al. | |
| 2006/0053407 A1 | 3/2006 | Kodosky et al. | |
| 2009/0259972 A1 | 10/2009 | Kodosky et al. | |
| 2015/0121533 A1* | 4/2015 | Gluck | G06F 11/3604 726/25 |

(Continued)

OTHER PUBLICATIONS

Title: User-friendly graph editing for procedural modeling of buildings, author: G Patow, published on 2010.*

(Continued)

*Primary Examiner* — Chameli Das
(74) *Attorney, Agent, or Firm* — Lee & Hayes, P.C.

(57) ABSTRACT

A system may provide a programming environment combining visual programming and text based programming. The system may determine a first node and a second node of a first plurality of nodes are native function call nodes of a visual graph-based programming language and determine a third node of the first plurality of nodes is a text-based node including text-based statements in a text-based programming language. In response to determining the third node of the first plurality of nodes is the text-based node, the system may interpret the text-based statements into a second plurality of nodes, the second plurality of nodes being native function call nodes of the visual graph-based programming language. The system may then generate a combined code based on the first plurality of nodes and the second plurality of nodes and compile the combined code.

20 Claims, 6 Drawing Sheets

(56) References Cited

U.S. PATENT DOCUMENTS

2019/0095176 A1     3/2019   Larson et al.
2020/0104366 A1*   4/2020   Xu .................. G06N 5/022
2022/0012437 A1*   1/2022   Kim ................. G06F 40/42

OTHER PUBLICATIONS

Title: Advances in dataflow programming languages, author: WM Johnston, published on 2004.*
Beck, et al."The First Approach to Object Oriented Programming for LabVIEW Real-Time Targets", IEEE Transactions on Nuclear Science, vol. 53, No. 3, Jun. 2006, pp. 930-935.
Borunda, et al. "GSPIM: Graphical Visualization Tool for MIPS Assembly Programming and Simulation", SIDCSE'06, ACM, Mar. 2006, pp. 244-248.

* cited by examiner

COMBINED BUILDING OF DUAL REPRESENTATION PROGRAM INSTRUCTIONS

CROSS-REFERENCE TO RELATED APPLICATION(S)

This application is a continuation of and claims priority to U.S. application Ser. No. 16/941,020, filed on Jul. 28, 2020 and entitled "COMBINED BUILDING OF DUAL REPRESENTATION PROGRAM INSTRUCTIONS," issuing as U.S. Pat. No. 11,080,026 on Aug. 3, 2021, the entirety of which is incorporated herein by reference.

BACKGROUND

Visual programming is a method of describing behavior in many systems such as animation, rendering, gameplay, and so on. Visual programming may be useful for users with or without a programming background. At the same time, some users, such as users with strong programming backgrounds, may prefer to work in text-based programming environments.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
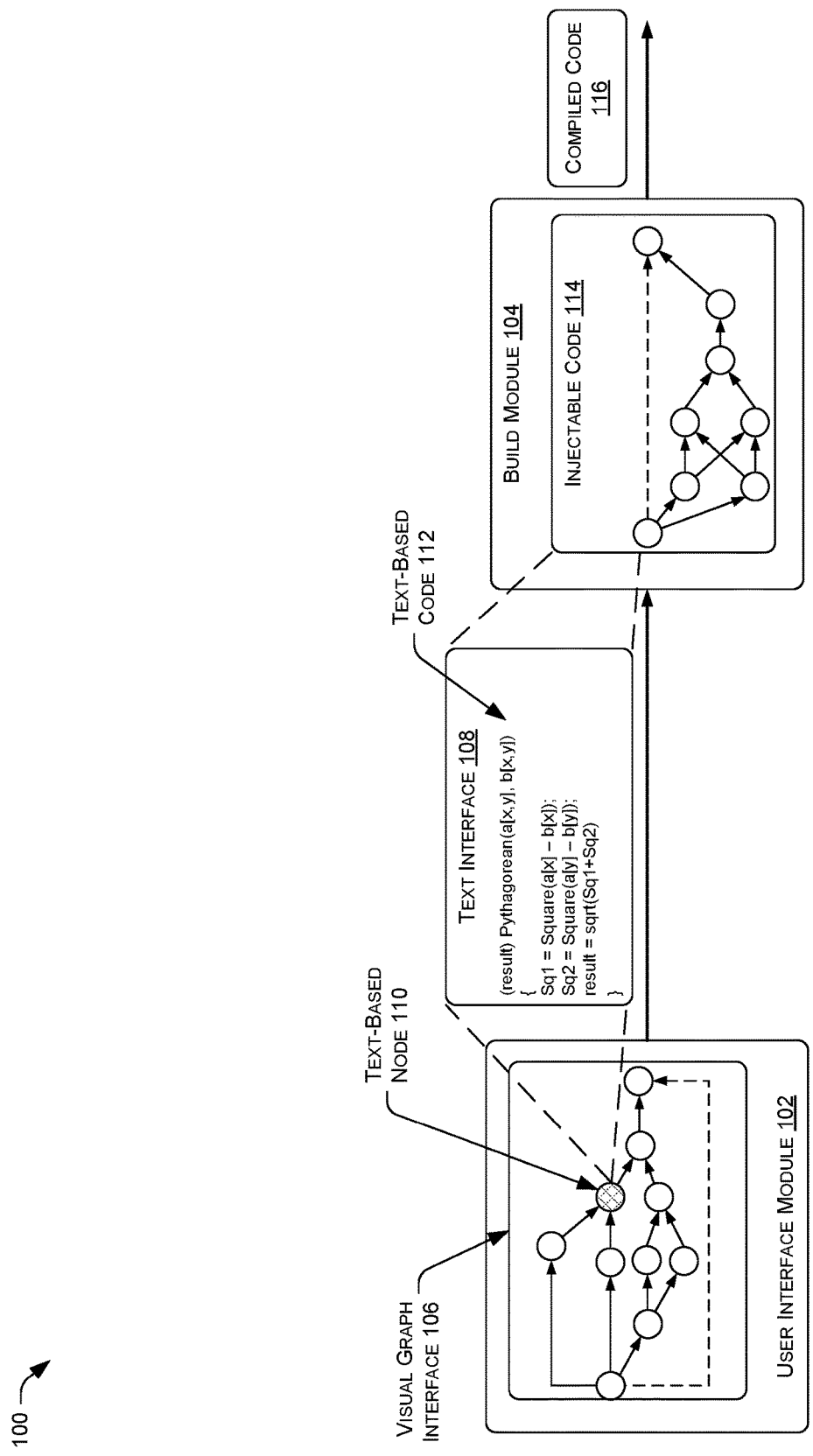
FIG. 1 illustrates a schematic diagram of an example system including a user interface module and a build module that may seamlessly combine or merge text-based programming with visual programming (e.g., visual graph-based programming), in accordance with example embodiments of the disclosure.

Example embodiments of this disclosure describe methods, apparatuses, computer-readable media, and system(s) that may allow for programming environments that may seamlessly combine or merge text-based programming with visual programming (e.g., visual graph-based programming). In example embodiments of the disclosure, a compiler or build pipeline may operate to interpret code in the text-based programming language into equivalent code in the visual programming language and inject the equivalent code into the visual program code in place of the text-based code. The compiler or build pipeline may then generate byte code or other executable code based on the visual program code including the injected equivalent code without distinguishing between the original visual program code and the equivalent code.

For example, example embodiments of the disclosure may include a programming environment including a user interface and compiler or other build pipeline (hereinafter referred to as "compiler" unless otherwise specified). The user interface may provide for entry of code in both a visual graph-based programming language and a text-based programming language.

For example, a visual graph-based programming interface may provide for design or entry of visual graph-based code. Such visual graph-based code may include visual graph-based programming language instructions using a node and edge syntax that may form a directed graph of operations. The nodes may represent functions or operations. For example, one or more of the nodes may be native function call nodes of the visual graph-based programming language (e.g., assignment, add, square, square root, etc.). The edges between nodes may represent data flows (e.g., input and output of variables or values) and/or control between nodes flows (e.g., to provide a direction to the directed graph).

The user interface may allow for the insertion of one or more text-based nodes into the visual graph-based programming interface. A text-based programming interface may then be used to enter text-based statements for the text-based node to form text-based code of the text-based programming language.

As mentioned above, during a build process, the text-based code of the text-based programming node may be interpreted into equivalent code in the visual programming language or an intermediate representation used during building of the visual programming language code (e.g., an intermediate representation prepared by a front-end as input to an Application Program Interface (API) of the compiler) (both hereinafter referred to together as injectable code unless otherwise specified). Such an injectable code may be a subgraph of graph-based programming nodes and edges. Some embodiments may include dynamic type resolution between the original visual program code and the injectable code after the injectable code is generated. The injectable code may then be injected into the directed graph of the visual graph-based code or the intermediate representation to form combined program code.

The compiler may then generate bytecode or other executable code based on the combined program code without distinguishing between the original visual program code and the injectable equivalent code.

In some embodiments, the resulting bytecode for the original visual program code and the injectable code may share a same runtime environment. This may provide an advantage in that, where different runtime environments are utilized, only one of the types of program code may be able to invoke execution of the other. Instead, by sharing a same runtime environment, both the text-based code and the visual program code may invoke execution of code of the other type. Additionally, the building of the combined program code may include cross domain optimization. For example, where calculations may be combined or precalculated, the build process may provide for the combination across the divide between the text-based code and the visual program code rather than stopping the optimization process at the call site of the other type of program code.

Depending on the implementation, the injectable code may or may not include information for the display of the injectable code in the visual programming interface. For example, in some implementations, the interpretation and injection of the injectable code may be performed by the compiler during the building of the combined program code without display of the resulting injectable or combined program code to the user. In an example in which the injectable code is a subgraph, nodes and edges may be generated for the subgraph of the injectable code but information related to the visual layout of the subgraph may be omitted. Herein, such injectable code, including node and edge data but without visual layout information may be referred to as a node and pin representation and may be an intermediate representation into which the visual graph-based code is translated for input to the build API.

Alternatively or additionally, some implementations may include functionality to generate a visual layout for the nodes and edges of the injectable code for display to the user. In some such implementations, the display of the injectable code may be a debug functionality and/or may be selectively and/or always performed.

In some embodiments, the interpretation of the text-based code into the injectable code and injection of the injectable code into the visual program code may allow the text-based code and the visual program code to share features. For example, the text-based code and the visual program code may pass information and share type resolution. Functions and calls to functions, whether defined in the program code or an included library, may also be shared. For example, a function defined in the visual program code may be called by the text-based code and vice versa. Similarly, library functions may be shared between a text-based code and the visual program code. For example, when a basic math library is included in or incorporated by the visual program code to provide library functions such as add, multiply, divide, and higher functions, the text-based code may subsequently include a statement calling the library function and vice versa.

The above noted potential shared features are merely examples and other features may also be shared.

The sharing of various features between the text-based code and the visual program code may alleviate difficulties for users. For example, where libraries are not shared, a user may be required to learn what is equivalent to the tools (e.g., library functions) of two different programming languages. Similarly, where functions are not shared, the user may be required to program the function in both the text-based code and the visual program code. Further, such duplication may increase the size of the program and the resource usage thereof.

Certain implementations and embodiments of the disclosure will now be described more fully below with reference to the accompanying figures, in which various aspects are shown. The following discussion focuses on environments that combine visual graph-based code with text-based code. However, the various aspects may be implemented in many different forms and should not be construed as limited to the implementations set forth herein. For example, while the discussion focuses on visual graph-based code, the various aspects may be implemented for other visual program code types. It will be appreciated that the disclosure encompasses other variations of the embodiments, as described herein. Like numbers refer to like elements throughout.

FIG. 1 illustrates a schematic diagram of an example system 100 including a user interface module 102 and a build module 104 that may seamlessly combine or merge text-based programming with visual graph-based programming, in accordance with example embodiments of the disclosure.

In operation, the user interface module 102 may provide interfaces for entry of source code including both text-based code and visual graph-based code. Specifically, the user interface module 102 may provide the visual graph interface 106 and the text interface 108. Visual graph-based code may be entered into the visual graph interface 106. The visual graph-based code may include a text-based node 110. Using the text interface 108, the user may input text-based code 112 for the text-based node 110. The source code may be output to the build module 104.

The build module 104 may receive the source code and begin building the visual graph-based code which may include a plurality of nodes connected by edges to form a directed graph. For example, the build module 104 may traverse a directed graph (e.g., traverse the nodes via the edges) to determine a node of the plurality of nodes is a text-based node 110 including a plurality of text-based statements of a text-based programming language (e.g., text-based code 112). These operations may be performed with respect to the visual graph-based code or an intermediate representation of the visual graph-based code generated for input to an API of the build module 104. The traversal and potential generation of the intermediate representation may also provide for the elimination of unnecessary or dead end graph-based nodes and edges (e.g., two assignments to the same variable without use between assignments). For example, the traversal may be performed in reverse order, starting at the end and working back to determine the nodes actually used in the execution of the program code.

The build module 104 may interpret the text-based code 112 of the text-based node 110 into an injectable code 114 which may be equivalent in function to the text-based code 112 (e.g., a graph-based code equivalent to in function to the text-based code 112 but in the syntax of the visual graph-based code or an intermediate representation of the visual graph-based code generated for input to an API of the build module 104). For example, the build module 104 may parse the text-based code 112 to determine operations invoked by the text-based statement of the text-based code 112. The build module 104 may generate nodes in the graph-based code that perform the determined operations. In some examples, the determination of nodes that perform the operation may be based on the operation and the variable types of input and outputs of text operations and the possible graph-based nodes that may be selected.

The build module 104 may then connect or pin the inputs and outputs of the generated nodes to form a subgraph (e.g., the injectable code 114) that performs operations that are equivalent to those of the text-based node. As mentioned above, the equivalent graph-based code may or may not include information for the display of the equivalent graph-based code in the visual graph interface 106. While intermediate representations are discussed herein in the form of flow graphs, other intermediate representations such as abstract syntax trees, parse trees, or similar structures may also be utilized.

Once the subgraph of graph-based nodes has been generated, the build module 104 may inject the injectable code 114 into the original graph-based code at the location of the text-based node 110 to form combined code comprising combined nodes and edges including the nodes and edges of the original graph-based code with the nodes and edges of the injectable code 114 substituted in place of the text based node 110.

The build module may then determine one or more dependencies between the combined nodes of the combined code. The build module 104 may determine an order of execution of the combined nodes based at least in part on the one or more dependencies between the combined nodes and edges. This order of execution that may be utilized during the generation of byte code or other executable code.

Based on the combined code, the build module 104 may generate compiled code 116. For example, the build module 104 may be a compiler that may generate byte code or other executable code based on the combined code without distinguishing between program code originally input as visual graph-based code and program code originally input as text-based code.

Though example implementation details are discussed above, variations are possible. For example, although one text-based node is included in the visual graph-based code, this is merely for ease of illustration and embodiments may support any number of text-based nodes. Further, other variations may relate to other combined building variations such as interpreting visual graph-based code into text based code or an intermediate representation of text-based code during building and injecting the interpreted code into the text-based code or an intermediate representation of the text-based code.

Figure 2:
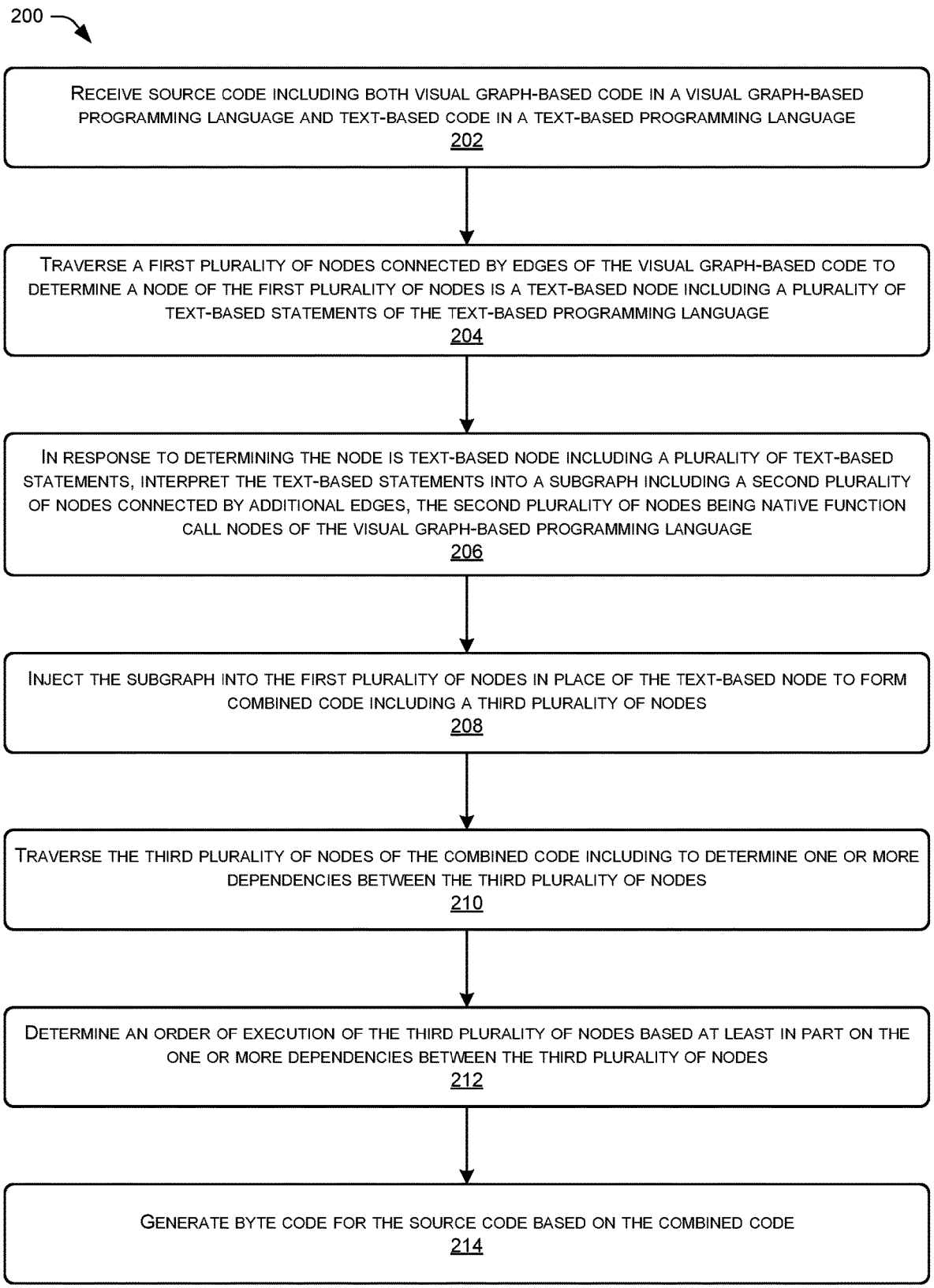
FIG. 2 illustrates a flow diagram of an example method that may be performed by a build pipeline to seamlessly combine or merge text-based programming with visual graph-based programming, in accordance with example embodiments of the disclosure.

FIG. 2 illustrates a flow diagram of an example method 200 that may be performed by a build pipeline to seamlessly combine or merge text-based programming with visual graph-based programming, in accordance with example embodiments of the disclosure. The method 200 may be performed by the system 100.

At block 202, the build module 104 may receive source code. In some examples, the source code may include both visual graph-based code in a visual graph-based programming language and text-based code in a text-based programming language. For example, the visual graph-based program code may include a first plurality of nodes connected by edges to form a directed graph, at least one of which is a text-based node including text-based code. The build module 104 may generate an intermediate representation or utilize the visual graph-based code directly in 204-214.

At 204, the build module 104 may traverse the first plurality of nodes of the visual graph-based code to determine that a node of the first plurality of nodes is a text-based node including a plurality of text-based statements of a text-based programming language.

Figure 4:
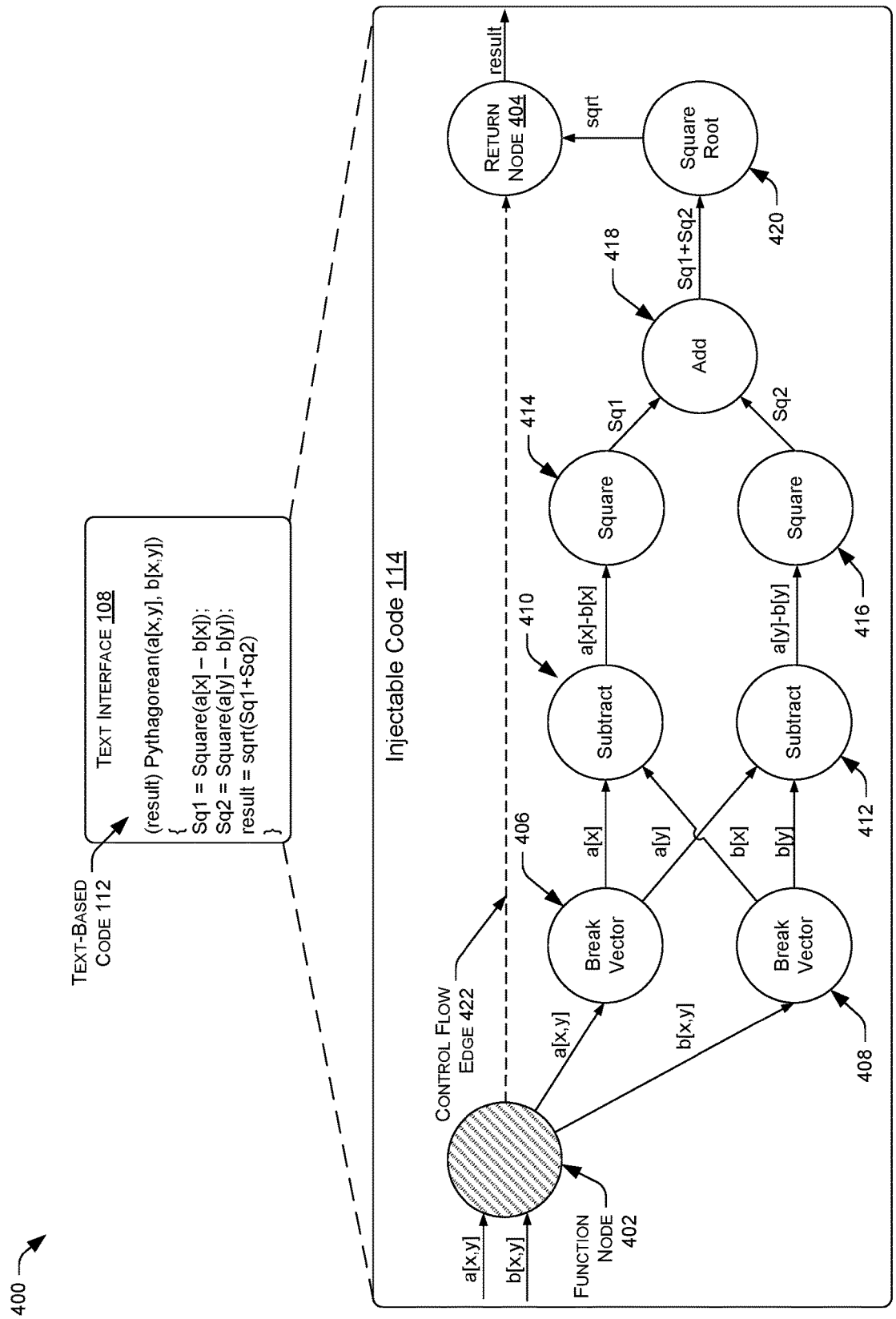
FIG. 4 illustrates an example of the interpretation of text-based code of the text-based node into injectable code, in accordance with example embodiments of the disclosure.

At 206, in response to the determining the node is a text-based node including a plurality of text-based statements, the build module 104 may interpret the text-based statements into a subgraph including a second plurality of nodes connected by additional edges, the second plurality of nodes being native function call nodes of the visual graph-based programming language. For example, the build module 104 may parse the text-based code of the text-based node to determine operations invoked by the text-based statement of the text-based node. In some examples, multi-operation text-based statements may be subdivided or reduced to constituent operations. The build module 104 may generate nodes in a graph-based programming language that perform the determined operations. The build module 104 may then connect or pin the inputs and outputs of the generated nodes to form a subgraph (e.g., the injectable code 114) that performs operations that are equivalent to those of the text-based node. As mentioned above, the injectable code may be in the visual graph-based programming language or may be in an intermediate representation (e.g., node and pin). As such, the injectable code may or may not include information for the display of the injectable code in the visual graph interface 106. An example of generating injectable code based on text-based code is illustrated in FIG. 4.

At 208, the build module 104 may generate combined code including a third plurality of nodes by injecting the subgraph into the first plurality of nodes in place of the text-based node. For examples, input edges to the text-based node may be redirected to serve as inputs to a node of the subgraph (e.g., the first node or function node) and input edges to the text-based node may be redirected to serve as output from a node of the subgraph (e.g., a last node or exit node of the subgraph). As with the injectable code 114, the combined code may be in the visual graph-based programming language or may be in an intermediate representation (e.g., node and pin).

At 210, the build module 104 may traverse the third plurality of nodes of the combined code to determine one or more dependencies between the third plurality of nodes. At 212, the build module 104 may determine an order of execution of the third plurality of nodes based at least in part on the one or more dependencies between the third plurality of nodes.

Then, at 214, the build module 104 may generate byte code for the source code based on the combined. The generation of the byte code may be based on the order of execution of the third plurality of nodes. Further, the generation of the byte code or other executable computer instructions may be performed without distinction between the nodes of the combined code that correspond to the original visual graph-based code and the nodes of the combined code that correspond to the injectable code 114 (e.g., correspond to the text-based code).

It should be noted that some of the operations of method 200 may be performed out of the order presented, with additional elements, and/or without some elements. Some of the operations of method 200 may further take place substantially concurrently and, therefore, may conclude in an order different from the order of operations shown above. Further, implementations are not limited to the details of the above examples and variations are possible.

Figure 3:
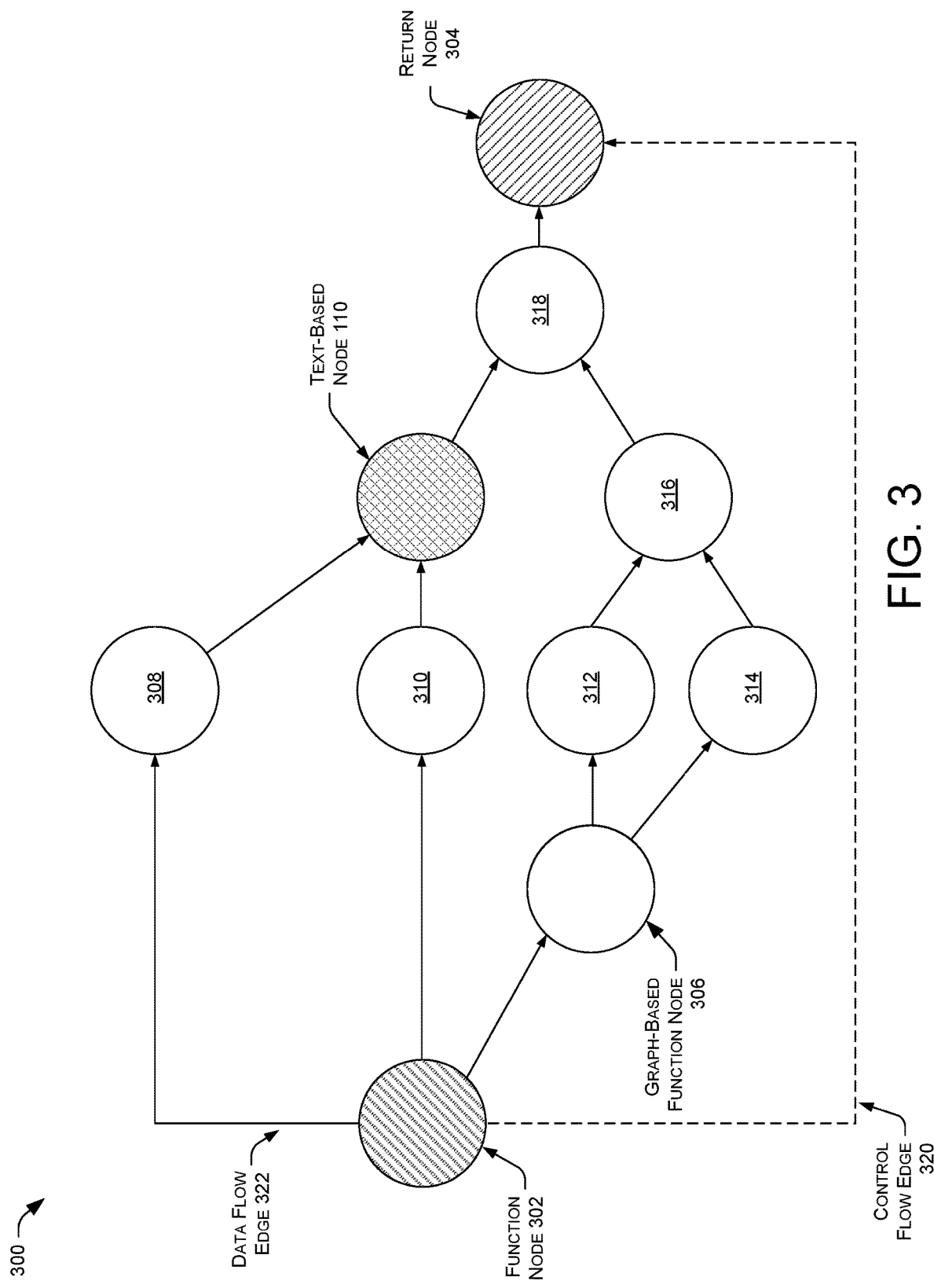
FIG. 3 illustrates an example graph-based code that include a text based node, in accordance with example embodiments of the disclosure.

FIG. 3 illustrates example graph-based code 300 that include a text based node, in accordance with example embodiments of the disclosure. The example graph-based code 300 may be an example view output by the user interface module 102 or may illustrate an intermediate representation generated for the visual graph-based code during the build process (e.g., as input to an API of the compiler or build module 104).

As illustrated, the graph-based code 300 includes a plurality of nodes 302-318 and 110. The plurality of nodes includes a function node 302, a return node 304, multiple graph-based function nodes 306-318, and a text-based node 110. Further, the nodes of the graph-based code are connected by control flow edge 320 and data flow edges 322.

The function node 302 may represent an entry point or function call for the function defined by the illustrated graph-based code 300. Similarly, the return node 304 may indicate an exit or return point for the function defined by the illustrated graph-based code 300. The function node 302 and the return node 304 are connected by a control flow edge 320 that may indicate the direction of control flow between the nodes of the function.

The graph-based function nodes 306-318 may represent function calls and/or operations of the visual graph-based programming language. Data flow edges 322 may connect the function node 302, graph-based function nodes 306-318, text-based node 110 and return node 304. As mentioned above, the data flows edges may specify input and output of variables or values between nodes 302-318 and 110.

In particular, the example illustrates two data flow edges as inputs to the text-based node 110 (e.g., one from node 308 and one from 310). As will be discussed in more detail with regard to FIG. 4, text-based node 110 may define a Pythagorean function to determine the distance between a pair of two-dimensional coordinates. The data flow edges from nodes 308 and 310 to text-based node 110 may each represent the input a two-dimensional coordinate in the form an array with a size of two. Similarly, the example illustrates a data flow edge from the text-based node 110 to the node 318. This data flow edge may represent an output from the text-based node 110 of the distance between the pair of two-dimensional coordinates.

Figure 5:
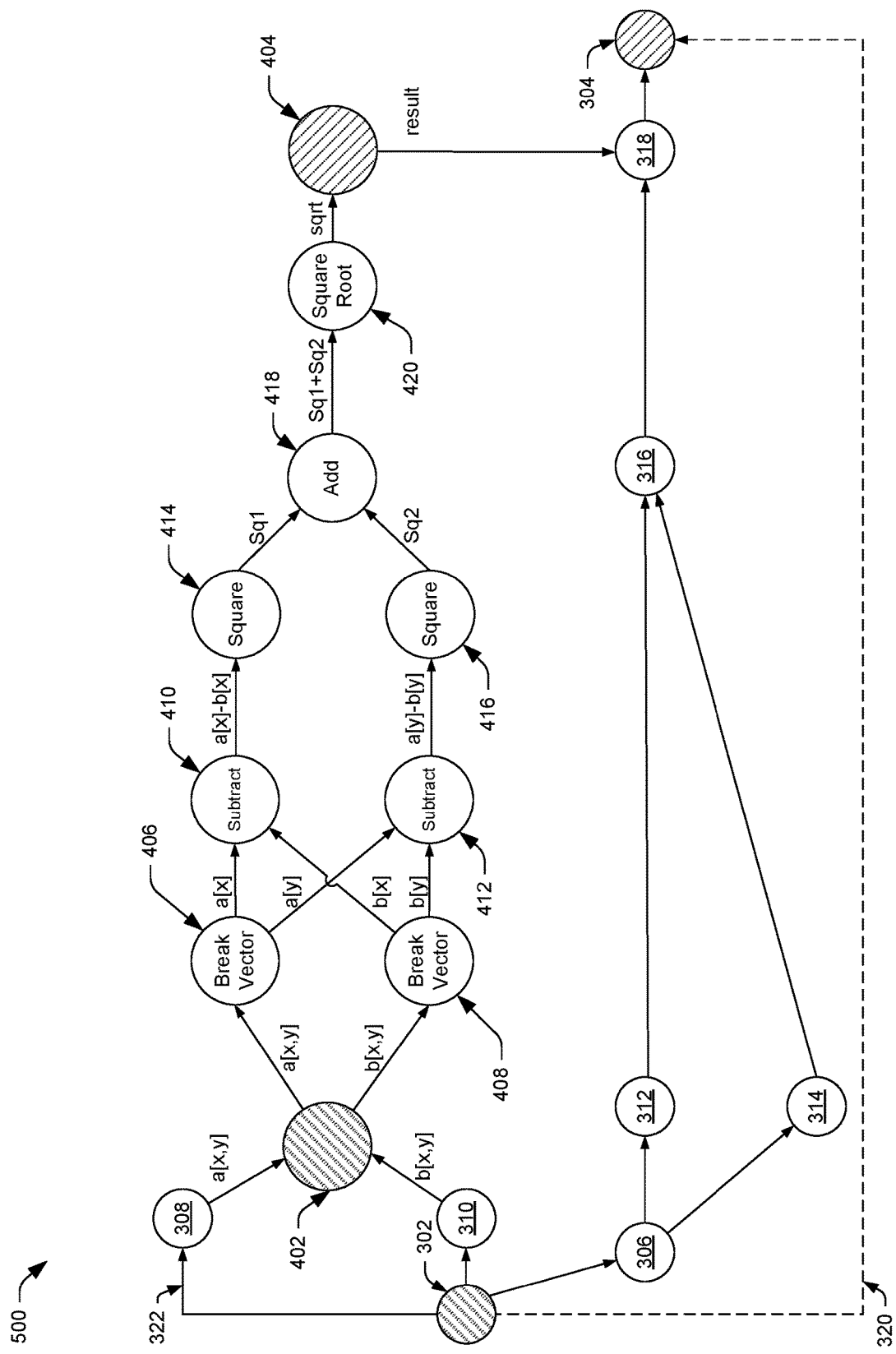
FIG. 5 illustrates an example of the injection of the injectable code into the graph-based code, in accordance with example embodiments of the disclosure.

As discussed above, the build module 104 may determine the text-based node 110 is a text-based node and perform an interpretation operation to generate injectable graph-based code equivalent to the text-based code of the text-based node 110. The injectable code may then be injected into the graph-based code 300 at the location of the text-based node 110. An example of these operations is shown in FIGS. 4 and 5.

FIG. 4 illustrates an example 400 of the interpretation of text-based code 112 of the text-based node 110 into injectable code 114, in accordance with example embodiments of the disclosure. More particularly, example 400 may illustrate the interpretation of the text-based code 112 of the text-based node 110 shown in text interface 108 for a Pythagorean function into injectable code 114. Of course, the Pythagorean function is used as an example herein for explanation purposes and the usage of the disclosed systems and methods on other functions, operations, programs and so on is contemplated and within the scope of this disclosure.

In operation, the build module 104 may parse the text-based code 112 and generate an intermediate representation of the text-based code 112. The intermediate representation of the text-based code 112 may then be translated into a nodes and pins representation or to a visual graph-based program language equivalent of the text-based code 112. One of ordinary skill in the art would be familiar with source-to-source compilers and understand how to accomplish the parsing and translation or interpretation in view of this disclosure.

In the illustrated example, the text-based code 112 relates to a function definition for a Pythagorean calculation that may determine the distance between a pair of two-dimensional coordinates in the form of two arrays with a size of two (e.g., a[x,y], b[x,y]). The calculated distance between the pair of two-dimensional coordinates may be returned by the function as a variable designated "result".

The text-based code includes three text-based statements. The first statement determines the distance along the x axis between the a and b coordinates, then squares the distance to determine "Sq1". The second does the same for the distance along the y axis as "Sq2". The variable "result" is then determined as the square root of the sum of "Sq1" and "Sq2."

As illustrated, the build module may parse the text-based code 112 and generate an intermediate representation of the three text-based statements which may include a flow graph in which every node may represents an individual instruction in the text-based programming language. The individual instructions in the text-based programming language may then each be converted to sets of one or more nodes representing individual instructions in the graph-based programming language that perform the equivalent function. The graph-based nodes may be interconnected by data flows and a control flow based on the variables and the order of the text-based instructions in the text-based code 112.

The resulting injectable code 114 may include a function node 402, a return node 404 and graph-based function nodes 406-420. The function node 402 may represent an entry point or function call for the function defined by the illustrated injectable code 114. Similarly, the return node 404 may indicate an exit or return point for the function defined by the illustrated injectable code 114. The function node 402 and the return node 404 are connected by a control flow edge 422 that may indicate the direction of control flow between the nodes of the function.

The graph-based function nodes 406-420 may represent individual instruction level operations of the graph-based programming language. Data flow edges may connect the function node 402, graph-based function nodes 406-420 and return node 404. As mentioned above, the data flow edges may specify input and output of variables or values between nodes 402-420.

In particular, the example illustrates two data flow edges as inputs to the function node 402. The data flow edges input to function node 402 may each represent a two-dimensional coordinate in the form an array with a size of two (e.g., a[x,y] and b[x,y]). The function node 402 may include two dataflow output edges (e.g., an output of array a[x,y] to node 406 and an output of array b[x,y] to node 408). Nodes 406 and 408 may receive the respective arrays a[x,y] and b[x,y] and perform the operation "break vector." Nodes 406 and 408 may include dataflow output edges to output the "x" value of the respective array via dataflow edges to node 410 and the "y" value of the respective array via dataflow edges to node 412. Nodes 410 and 412 may subtract the received "b" value from the received "a" value and output the result via dataflow edges to nodes 414 and 416, respectively. Nodes 414 and 416 may perform a square operation on the received input value and output the respective result via dataflow edges to node 418. Node 418 may perform an addition operation on the received squares and outputs the sum via a dataflow edge to node 420. Finally, node 420 may perform a square root operation on the received sum and output the square root via a dataflow edge to return node 404. Return node 404 may output the received square root as the "result" return value of the Pythagorean function.

While the example injectable code 114 is illustrated as having nodes representing individual instructions, embodiments are not so limited. For example, if a "subtract and square" function node is defined for the visual graph-based programming language, nodes 410 and 414 and nodes 412 and 416 may be collapsed respectively. Further, while not shown herein for simplicity, other examples may include the capability for additional or more complex sets of control flow edges to be added during the interpretation within the injectable code. For example, the control flow edges may allow for delayed execution (e.g., where a next instructions should not execute until completion of a prior action). Other example functionality provided by control flow edges would be understood by the skilled artisan in view of this disclosure.

The generation of the injectable code 114 may vary from implementation to implementation based on the parsing and interpretation algorithm and the capabilities of the text-based programming language and graph-based programming language utilized by the programming environment.

As discussed above, once the injectable code 114 is generated, the build module 104 may inject the injectable code 114 into the graph-based code 300 at the location of the text-based node 110. An example of this operation is shown in FIG. 5.

FIG. 5 illustrates an example 500 of the injection of the injectable code 114 into the graph-based code 300, in accordance with example embodiments of the disclosure. As noted above, the graph-based code 300 may be visual graph-based code or may be an intermediate representation in the form of graph-based code (e.g., node and pin representation and/or in a representation that may be input to an API of the build pipeline of the build module 104).

As discussed above, the text-based node 110 included data flow edges from nodes 308 and 310 to text-based node 110 may each represent the input a two-dimensional coordinate in the form an array with a size of two and a data flow edge from the text-based node 110 to the node 318 that may represent an output of the distance between the pair of two-dimensional coordinates.

In operation, the build module 104 may inject the injectable code 114 into the graph-based code 300 by connecting the data flow edges from nodes 308 and 310 to text-based node 110 to the function node 402 and by connecting the output edge from node 404 to the node 318.

As a result, the graph-based code of the example 500 includes nodes and edges that may be used to generate byte code or other executable code without distinguishing between the graph-based code 300 and the injectable code 114.

The resulting bytecode for the graph-based code 300 and the injectable code 114 may share a same runtime environment. This may provide an advantage in that, where different runtime environments are utilized, only one of the types of program code may be able to invoke execution by the other. Instead, by sharing a same runtime environment, both the text-based code and the visual graph-based code may invoke execution of program code of the other type. Additionally, the building of the graph-based code including the injectable code 114 may include cross domain optimization. For example, where calculations may be combined or precalculated, the build process may provide for the combination across the divide between the text-based code and the visual graph-based code rather than stopping the optimization process at the call site of the type of program code.

Additional potential features of the disclosed systems and methods according to this disclosure and that may be provided thereby are discussed above.

In addition to outputting byte code or visual graph-based code including the injectable code, other examples may provide additional or alternative outputs. For example, the system may translate the combined code including the original graph-based code and the injectable code 114 into text code (e.g., C++ or HLSL). More particularly, the build module 104 may additionally or alternatively include a C++ back-end that may translate the combined code into case C++ (e.g., before or after optimization of the combined code). For example, an Add node may become a "+" and a "Divide" node may become a "/". A Sqrt( ) node may become "rw::math::sqrt( )" and the multiplication of a vector and a matrix may become "rw::math::Transform( )".

Figure 6:
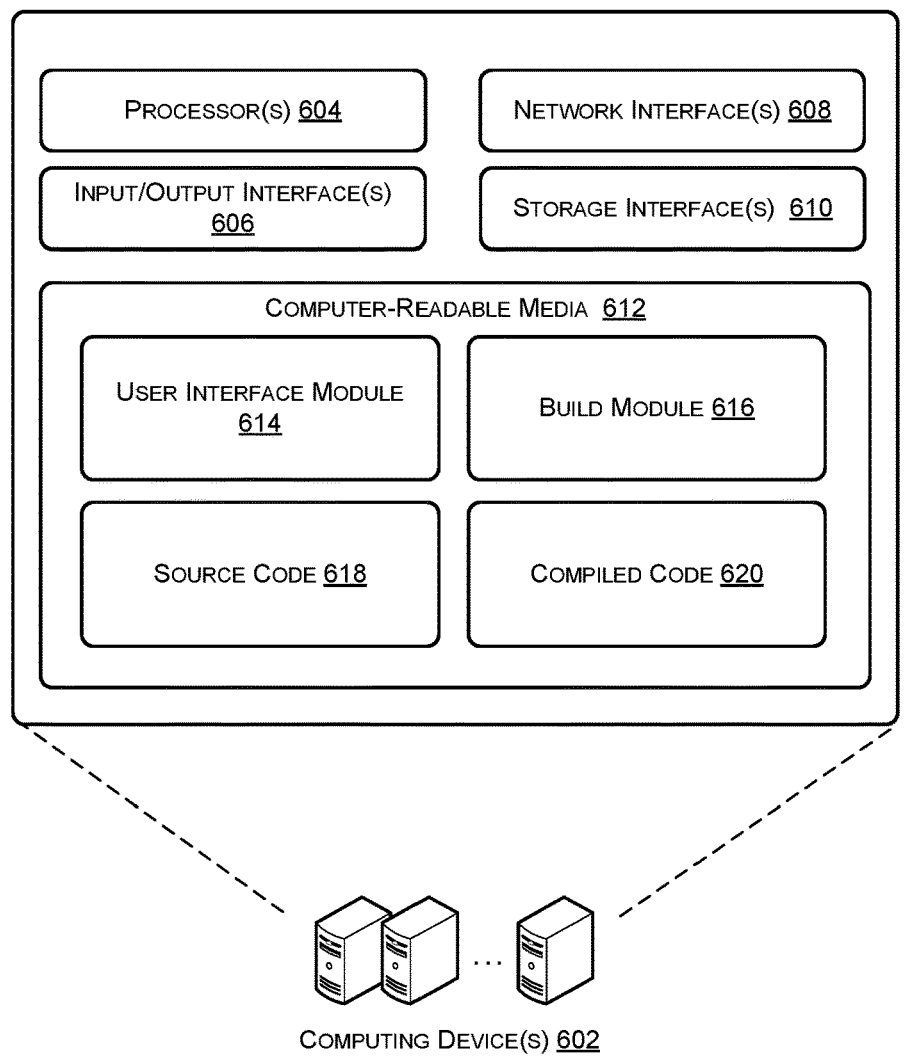
FIG. 6 illustrates a block diagram of an example system including one or more computing device(s) that may provide a programming environment that may seamlessly combine or merge text-based programming with visual graph-based programming, in accordance with example embodiments of the disclosure.

FIG. 6 illustrates a block diagram of an example system 600 including one or more computing device(s) 602 that may provide a programming environment that may seamlessly combine or merge text-based programming with visual programming (e.g., visual graph-based programming), in accordance with example embodiments of the disclosure. The computing device(s) 602 may include one or more processor(s) 604, one or more input/output (I/O) interface(s) 606, one or more network interface(s) 608, one or more storage interface(s) 610, and computer-readable media 612.

In some implementations, the processors(s) 604 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 604 may possess its own local memory, which also may store program modules, program data, and/or one or more operating system(s). The one or more processor(s) 604 may include one or more cores.

The one or more input/output (I/O) interface(s) 606 may enable a user to interact with the user interface module 102 to enter and request a building of source code that includes both text-based programming with visual programming (e.g., visual graph-based programming). The I/O interface(s) 606 may include a combination of hardware, software, and/or firmware and may include software drivers for enabling the operation of any variety of I/O device(s) integrated on the system 100 or with which the system 100 interacts, such as displays, microphones, speakers, cameras, switches, and any other variety of sensors, or the like.

The network interface(s) 608 may enable the system(s) 100 to communicate via the one or more network(s). The network interface(s) 608 may include a combination of hardware, software, and/or firmware and may include software drivers for enabling any variety of protocol-based communications, and any variety of wireline and/or wireless ports/antennas. For example, the network interface(s) 608 may comprise one or more of a cellular radio, a wireless (e.g., IEEE 606.1x-based) interface, a Bluetooth® interface, and the like. In some embodiments, the network interface(s) 608 may include radio frequency (RF) circuitry that allows the system(s) 100 to transition between various standards. The network interface(s) 608 may further enable the system(s) 100 to communicate over circuit-switch domains and/or packet-switch domains.

The storage interface(s) 610 may enable the processor(s) 604 to interface and exchange data with the computer-readable media 612, as well as any storage device(s) external to the system(s) 100, such as the user interface module block 614 (e.g., which may correspond to user interface module 102) and the build module block 616 (e.g., which may correspond to build module 104.

The computer-readable media 612 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 612 may be implemented as computer-readable storage media (CRSM), which may be any available physical media accessible by the processor(s) 604 to execute instructions stored on the computer readable media 612. In one basic implementation, CRSM may include RAM and Flash memory. In other implementations, CRSM may include, but is not limited to, ROM, EEPROM, or any other tangible medium which can be used to store the desired information and which can be accessed by the processor(s) 604. The computer-readable media 612 may have an operating system (OS) and/or a variety of suitable applications stored thereon. The OS, when executed by the processor(s) 604 may enable management of hardware and/or software resources of the system(s) 100.

Several functional blocks having instruction, data stores, and so forth may be stored within the computer-readable media 612 and configured to execute on the processor(s) 604. The computer readable media 612 may have stored thereon the user interface block 614 and the build module block 616. It will be appreciated that each of the functional blocks 614 and 616 may have instructions stored thereon that when executed by the processor(s) 604 may enable various functions pertaining to the operations of the system(s) 100.

The instructions stored in the user interface module block 614, when executed by the processor(s) 604, may configure the system(s) 100 to provide a programming environment which merges text based programming with visual programming. Through the user interface module block 614, the user may enter source code 618 including both visual program code and text-based code. The user interface module block 614 may further enable the user to operate the build module block 616 to compile or build the source code 618 to generate compiled code 620. The build module block 616 may operate as discussed above to generate compiled code (e.g., bytecode or other executable code).

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
   one or more processors; and
   one or more non-transitory computer-readable storage media storing computer-executable instructions that, when executed by the one or more processors, cause the one or more processors to:
   receive source code comprising visual graph-based programming language instructions, wherein the visual graph-based programming language instructions comprise a first plurality of nodes connected by a plurality of edges to form a directed graph, at least a first node of the first plurality of nodes being a native function call node of the visual graph-based programming language and at least a second node of the first plurality of nodes being a text-based node including a plurality of text-based statements of a text-based programming language;

build the source code into byte code by:
  determining the second node is a text-based node including the plurality of text-based statements;
  in response to determining the second node is a text-based node including the plurality of text-based statements, interpreting the text-based statements into a second plurality of nodes connected by one or more additional edges, the second plurality of nodes being native function call nodes of the visual graph-based programming language;
  generating a combined code by injecting the second plurality of nodes into the first plurality of nodes in place of the second node;
  generating the byte code for the source code based on the combined code.

2. The system of claim 1, wherein the interpreting and injecting are performed so that the byte code is generated without distinction between a portion of the combined code corresponding to the first plurality of nodes and a portion of the combined code corresponding to the text-based statements.

3. The system of claim 1, wherein the byte code generated based on a portion of the combined code corresponding to the first plurality of nodes and a portion of the combined code corresponding to the text-based statements share a runtime environment.

4. The system of claim 1, wherein an edge of the plurality of edges represents a data flow or a control flow.

5. The system of claim 1, wherein the text-based statements include a function call to a function defined in the visual graph-based programming language.

6. The system of claim 1, wherein the text-based statements include a call to a function added by a library included in a third node of the first plurality of nodes, the third node being a native function call node of the visual graph-based programming language.

7. A computer-implemented method, comprising:
  building computer instructions from source code including visual graph-based code and text-based code including:
    determining a first node of a first plurality of nodes and a second node of the first plurality of nodes are native function call nodes of a visual graph-based programming language of the visual graph-based code;
    determining a third node of the first plurality of nodes is a text-based node including text-based statements of the text-based code in a text-based programming language, wherein the first plurality of nodes are connected by a first plurality of edges including a first edge from the first node to the third node and a second edge from the third node to the second node;
    in response to determining the third node of the first plurality of nodes is the text-based node, interpreting the text-based statements into a second plurality of nodes connected by a second plurality of additional edges, the second plurality of nodes being native function call nodes of the visual graph-based programming language;
    generating a combined code based on the first plurality of nodes and the second plurality of nodes at least in part by injecting the second plurality of nodes in place of the third node; and
    compiling the combined code.

8. The computer-implemented method of claim 7, wherein the second plurality of nodes are injected in place of the third node so that the first edge is connected from the first node to a fourth node of the second plurality of nodes and the second edge is connected from a fifth node of the second plurality of nodes to the second node.

9. The computer-implemented method of claim 7, wherein an edge of the first plurality of edges represents a data flow or a control flow.

10. The computer-implemented method of claim 7, wherein the determining the third node of the first plurality of nodes is a text-based node comprises traversing the first plurality of nodes and the first plurality of edges.

11. The computer-implemented method of claim 7, wherein the compiling the combined code generates byte code for the source code including the visual graph-based code and the text-based code.

12. The computer-implemented method of claim 11, wherein a first portion of the byte code generated based on a first portion of the combined code corresponding to the visual graph-based code shares a runtime environment with a second portion of the byte code generated based on a second portion of the combined code corresponding to the text-based code.

13. The computer-implemented method of claim 7, wherein:
  the generating the combined code based on the first plurality of nodes and the second plurality of nodes is at least partly performed by generating a third plurality of nodes of the combined code by injecting the second plurality of nodes in place of the third node;
  the building the computer instructions from the source code further includes:
    determining one or more dependencies between the third plurality of nodes;
    determining an order of execution of the third plurality of nodes based at least in part on the one or more dependencies between the third plurality of nodes; and
  the compiling the combined code generates at least part of the computer instructions based on the combined code and the order of execution.

14. The computer-implemented method of claim 7, wherein a visual representation of the second plurality of nodes is not output to a user.

15. A system, comprising:
  one or more processors; and
  one or more non-transitory computer-readable storage media storing computer-executable instructions that, when executed by the one or more processors, cause the one or more processors to perform operations comprising:
  building computer instructions from source code including visual graph-based code and text-based code including:
    determining a first node of a first plurality of nodes and a second node of the first plurality of nodes are native function call nodes of a visual graph-based programming language of the visual graph-based code;
    determining a third node of the first plurality of nodes is a text-based node including text-based statements of the text-based code in a text-based programming language, wherein the first plurality of nodes are connected by a first plurality of edges including a first edge from the first node to the third node of the first plurality of nodes and a second edge from the third node to the second node;

in response to determining the third node of the first plurality of nodes is the text-based node, interpreting the text-based statements into a second plurality of nodes connected by a second plurality of additional edges, wherein the second plurality of nodes are native function call nodes of the visual graph-based programming language;

generating a combined code based on the first plurality of nodes and the second plurality of nodes at least in part by injecting the second plurality of nodes in place of the third node; and compiling the combined code.

16. The system of claim 15, wherein the second plurality of nodes are injected in place of the third node so that the first edge is connected from the first node to a fourth node of the second plurality of nodes and the second edge is connected from a fifth node of the second plurality of nodes to the second node.

17. The system of claim 15, wherein the determining the third node of the first plurality of nodes is a text-based node comprises traversing the first plurality of nodes and the first plurality of edges.

18. The system of claim 15, wherein the compiling the combined code generates byte code for the source code including the visual graph-based code and the text-based code.

19. The system of claim 18, wherein the compiling is performed so that the byte code is generated without distinction between a portion of the combined code corresponding to the visual graph-based code and a portion of the combined code corresponding to the text-based code.

20. The system of claim 15, wherein:

the generating the combined code based on the first plurality of nodes and the second plurality of nodes is at least partly performed by generating a third plurality of nodes of the combined code by injecting the second plurality of nodes in place of the third node;

the building the computer instructions from the source code further includes:

determining one or more dependencies between the third plurality of nodes;

determining an order of execution of the third plurality of nodes based at least in part on the one or more dependencies between the third plurality of nodes; and the compiling the combined code generates at least part of the computer instructions based on the combined code and the order of execution.

* * * * *